(12) United States Patent
Hirukawa

(10) Patent No.: US 12,293,132 B2
(45) Date of Patent: May 6, 2025

(54) DISPLAY CONTROL SYSTEM, DISPLAY CONTROL METHOD, AND RECORDING MEDIUM RECORDING A DISPLAY CONTROL PROGRAM FOR DISPLAYING USER ICONS IN A VIRTUAL SPACE

(71) Applicant: SHARP KABUSHIKI KAISHA, Sakai (JP)

(72) Inventor: Keiko Hirukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 28 days.

(21) Appl. No.: 18/226,735

(22) Filed: Jul. 26, 2023

(65) Prior Publication Data
US 2024/0053950 A1  Feb. 15, 2024

(30) Foreign Application Priority Data

Aug. 10, 2022 (JP) .................................. 2022-127828

(51) Int. Cl.
*G06F 3/16*  (2006.01)
*G06F 3/04817*  (2022.01)

(52) U.S. Cl.
CPC .......... *G06F 3/165* (2013.01); *G06F 3/04817* (2013.01)

(58) Field of Classification Search
CPC .................... G06F 3/04817; G06F 3/04815
See application file for complete search history.

(56) References Cited

U.S. PATENT DOCUMENTS

| | | | | |
|---|---|---|---|---|
| 11,921,970 | B1* | 3/2024 | Hoover | G06F 3/017 |
| 2008/0252637 | A1* | 10/2008 | Berndt | G06T 19/00 |
| | | | | 345/419 |
| 2009/0106670 | A1* | 4/2009 | Berndt | H04L 12/1822 |
| | | | | 715/757 |
| 2009/0113448 | A1* | 4/2009 | Smith | G06N 3/006 |
| | | | | 719/314 |
| 2009/0307611 | A1* | 12/2009 | Riley | A63F 13/216 |
| | | | | 715/757 |
| 2010/0030804 | A1* | 2/2010 | Behrends | G06F 16/273 |
| | | | | 707/E17.009 |
| 2012/0204118 | A1* | 8/2012 | Lefar | G06F 3/04883 |
| | | | | 715/756 |
| 2012/0246582 | A1* | 9/2012 | Leacock | H04L 51/043 |
| | | | | 715/753 |
| 2013/0024785 | A1* | 1/2013 | Van Wie | H04L 12/1827 |
| | | | | 715/753 |

(Continued)

FOREIGN PATENT DOCUMENTS

JP  2009-093478 A  4/2009

*Primary Examiner* — Asher D Kells
(74) *Attorney, Agent, or Firm* — ScienBiziP, P.C.

(57) ABSTRACT

A display control system includes a first display processing unit that displays a first user icon of a user at a predetermined position in a virtual space on the basis of a current position of the user in a real space, a reception processing unit that receives, from the user corresponding to the first user icon, moving operation of the first user icon displayed at the predetermined position in the virtual space, and a second display processing unit that displays a second user icon corresponding to the moving operation by the user in the virtual space, in a case where the reception processing unit receives the moving operation of the first user icon from the user.

10 Claims, 15 Drawing Sheets

(56) References Cited

U.S. PATENT DOCUMENTS

| | | | | |
|---|---|---|---|---|
| 2013/0174059 | A1* | 7/2013 | Van Wie | G06F 3/011 |
| | | | | 715/757 |
| 2014/0115502 | A1* | 4/2014 | Van Wie | G06F 3/011 |
| | | | | 715/757 |
| 2018/0063480 | A1* | 3/2018 | Luks | H04N 7/147 |
| 2022/0279317 | A1* | 9/2022 | Hohman | H04L 67/52 |
| 2022/0321507 | A1* | 10/2022 | Skuratowicz | G06F 3/0481 |
| 2022/0345325 | A1* | 10/2022 | Jung | H04L 12/1827 |
| 2022/0345666 | A1* | 10/2022 | Jung | H04L 12/1831 |
| 2023/0044865 | A1* | 2/2023 | Pitts | H04M 3/568 |
| 2023/0045116 | A1* | 2/2023 | Pitts | H04N 7/152 |
| 2023/0169418 | A1* | 6/2023 | Singh | G06Q 10/06311 |
| | | | | 705/7.13 |
| 2023/0246861 | A1* | 8/2023 | Waibel | G06F 3/0482 |
| | | | | 709/204 |
| 2023/0274500 | A1* | 8/2023 | Kikuchi | G06F 3/04815 |
| | | | | 345/419 |
| 2023/0421724 | A1* | 12/2023 | Fukai | H04N 7/157 |
| 2024/0019984 | A1* | 1/2024 | Iwamoto | G06F 3/04817 |
| 2024/0020088 | A1* | 1/2024 | Kumata | G06F 3/04847 |
| 2024/0098122 | A1* | 3/2024 | Bhattacharyya | H04L 63/0876 |
| 2024/0214525 | A1* | 6/2024 | Ma | H04N 7/157 |

* cited by examiner

USER INFORMATION MANAGEMENT TABLE

| USER NAME | USER ID | USER POSITION | USER ICON POSITION |
|---|---|---|---|
| A | a001 | OFFICE (p1) | p11 |
| B | b002 | OFFICE (p2) | p12 |
| C | c003 | HOME (p3) | p13 |
| D | d004 | OFFICE (p4) | p14 |
| E | e005 | HOME (p5) | p15 |

SETTING INFORMATION MANAGEMENT TABLE

| USER NAME | USER ID | MICROPHONE SETTING | SPEAKER SETTING |
|---|---|---|---|
| A | a001 | OFF | OFF |
| B | b002 | ON | ON |
| C | c003 | ON | ON |
| D | d004 | ON | ON |
| E | e005 | ON | ON |

DISPLAY CONTROL SYSTEM, DISPLAY CONTROL METHOD, AND RECORDING MEDIUM RECORDING A DISPLAY CONTROL PROGRAM FOR DISPLAYING USER ICONS IN A VIRTUAL SPACE

INCORPORATION BY REFERENCE

This application is based upon and claims the benefit of priority from the corresponding Japanese Patent Application No. 2022-127828 filed on Aug. 10, 2022, the entire contents of which are incorporated herein by reference.

BACKGROUND

The present disclosure relates to a display control system, a display control method, and a recording medium recording a display control program for controlling display of user icons displayed on a virtual space.

There is known a conventional system capable of receiving position information of a user in a real space, converting the position information into position information in a virtual space, and moving an icon (avatar) associated with the user in the virtual space, in the virtual space, on the basis of the position information.

In recent years, a work style that mixes an employee who comes to an office to work with an employee who works remotely from home has become widespread. In such a work style, it is difficult to determine whether it is possible to meet and directly have conversation with a user in a real space when a system is configured to display user icons in a virtual space corresponding to a user's current position in a real space, like the conventional system. In addition, it is difficult for a user who performs remote work to determine whether or not any other user is available for conversation in the virtual space, although the user can determine the current position of the other user. This causes a problem that user's convenience in the system that displays user icons in a virtual space is reduced.

SUMMARY

An object of the present disclosure is to provide a display control system, a display control method, and a recording medium recording a display control program capable of improving user's convenience in a system that displays user icons in a virtual space.

A display control system according to an aspect of the present disclosure includes a first display processing unit, a reception processing unit, and a second display processing unit. The first display processing unit displays a first user icon of a user at a predetermined position in a virtual space on the basis of a current position of the user in a real space. The reception processing unit receives, from the user corresponding to the first user icon, moving operation of the first user icon displayed at the predetermined position in the virtual space. The second display processing unit displays a second user icon corresponding to the moving operation by the user in the virtual space, in a case where the reception processing unit receives the moving operation of the first user icon from the user.

A display control method according to another aspect of the present disclosure is a display control method executed by one or a plurality of processors, including: displaying a user icon of a user at a predetermined position in a virtual space on the basis of a current position of the user in a real space; receiving, from the user corresponding to the user icon, moving operation of the user icon in the virtual space; and individually displaying a first user icon corresponding to the current position of the user, and a second user icon corresponding to the moving operation by the user, in the virtual space, in a case where the moving operation of the user icon is received from the user.

A recording medium according to another aspect of the present disclosure is a recording medium recording a display control program for causing one or a plurality of processors to execute: displaying a user icon of a user at a predetermined position in a virtual space on the basis of a current position of the user in a real space; receiving, from the user corresponding to the user icon, moving operation of the user icon in the virtual space; and individually displaying a first user icon corresponding to the current position of the user, and a second user icon corresponding to the moving operation by the user, in the virtual space, in a case where the moving operation of the user icon is received from the user.

According to the present disclosure, it is possible to provide a display control system, a display control method, and a recording medium recording a display control program capable of improving user's convenience in a system that displays user icons in a virtual space.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of a user information management table according to the embodiment of the present disclosure.

FIG. 4 is a diagram illustrating an example of a setting information management table according to the embodiment of the present disclosure.

DETAILED DESCRIPTION

Hereinafter, an embodiment of the present disclosure will be described with reference to the attached drawings. The following embodiment is an example in which the present disclosure is embodied, and does not limit the technical scope of the present disclosure.

A display control system according to the present disclosure is a system that displays user icons in a specific area (e.g., a virtual office) set in a virtual space and moves the user icons to enable users of the user icons in the specific area to have conversation with each other. In addition, the display control system has a function of displaying a user icon of a user in a virtual office on the basis of a position (current position) of the user in a specific area (real office) in a real space. In the following embodiment, a virtual office system is used as an example of the display control system according to the present disclosure.

The virtual office system can be applied, for example, to a Web meeting (online conversation, online meeting) or the like where a plurality of users have voice conversation in a virtual space by using user terminals such as laptop computers and smartphones, while being in different locations (such as offices in real space, and homes). In addition, the virtual office system includes a conversation server that provides online conversation and online meeting services by means of a virtual office application, which is general-purpose software for executing an online meeting in the virtual space, a management server that provides a management service for managing the virtual office, and the like.

Virtual Office System 100

Figure 1:
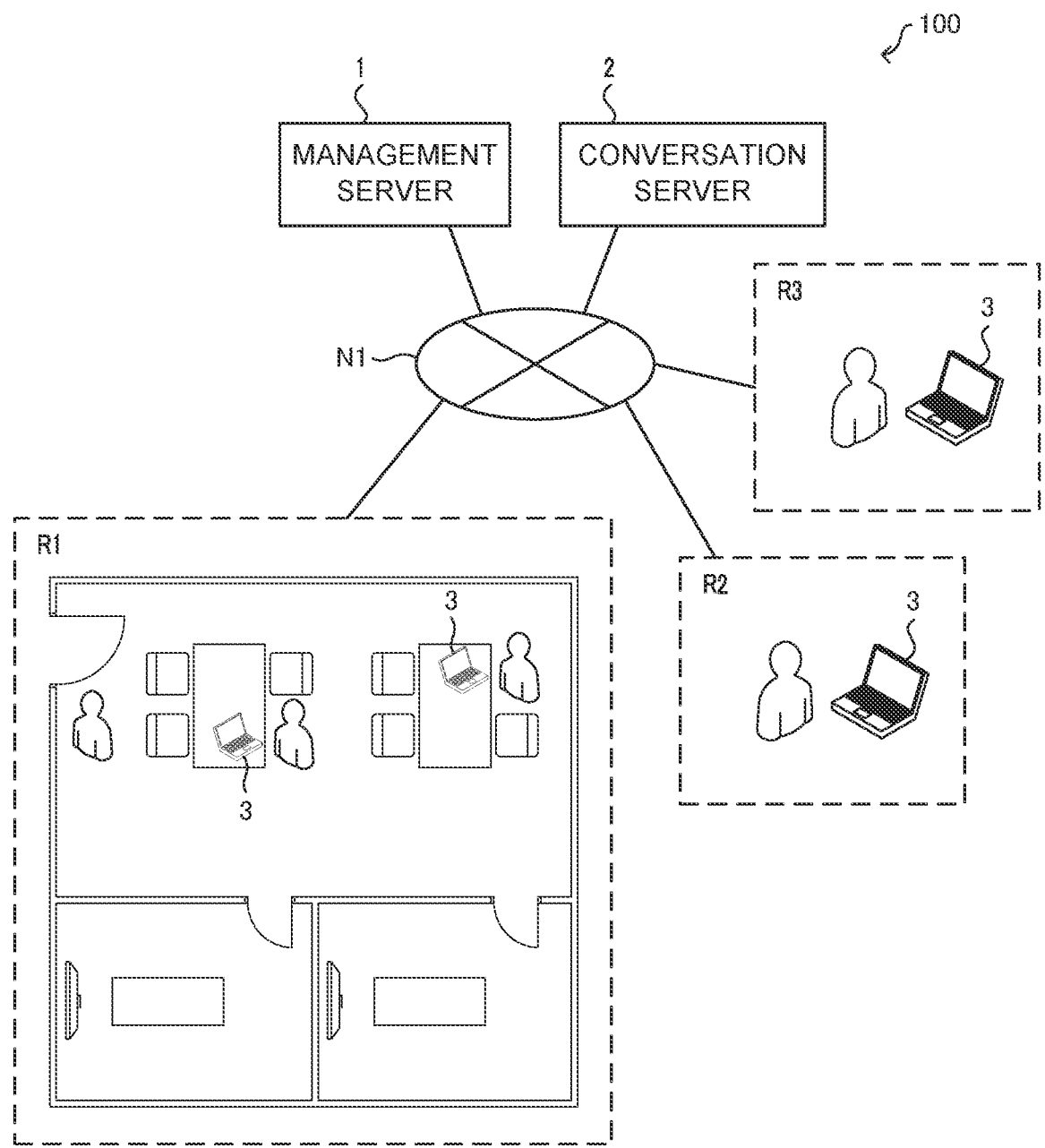
FIG. 1 is a schematic diagram illustrating a schematic configuration of a virtual office system according to an embodiment of the present disclosure.

FIG. 1 is a schematic diagram illustrating a schematic configuration of a virtual office system 100 according to the embodiment of the present disclosure. The virtual office system 100 includes a management server 1, a conversation server 2, and a user terminal 3. The virtual office system 100 is a system that constructs a virtual office that can be used by a plurality of users.

FIG. 1 illustrates an office R1 in a real space, and a plurality of bases (e.g., homes R2 and R3 of users) different from the office R1. For example, an example in which three users who come to the office R1 to work and two users who work at home (remote work). Each user can join the virtual office using his/her own user terminal 3 (e.g., a laptop computer).

The virtual office system 100 enables a plurality of users to conduct an online meeting at remote locations by running virtual office applications installed on respective user terminals 3. The virtual office application is general-purpose software, and a plurality of users who participate in the same virtual office and use the common virtual office application.

For example, the users in the office R1 and the users at homes can have conversation at their respective user terminals 3, in the virtual space (virtual office), by activating the virtual office applications and logging in.

The virtual office system 100 may be configured such that each base (such as an office and a home) is connected to a microphone speaker device, a camera, and the like that can be connected to the user terminal 3, and bidirectional communication of audio and camera images can be conducted. The microphone speaker device and the camera may be built into each user terminal 3.

The management server 1 and the conversation server 2 are each constructed by, for example, one or a plurality of server devices (e.g., cloud servers). In addition, the management server 1 and the conversation server 2 may be constructed by one server.

The management server 1, the conversation server 2, and the user terminal 3 are connected to each other via a network N1. The network N1 is a communication network such as the Internet, a LAN, a WAN, and a public telephone line.

Figure 2:
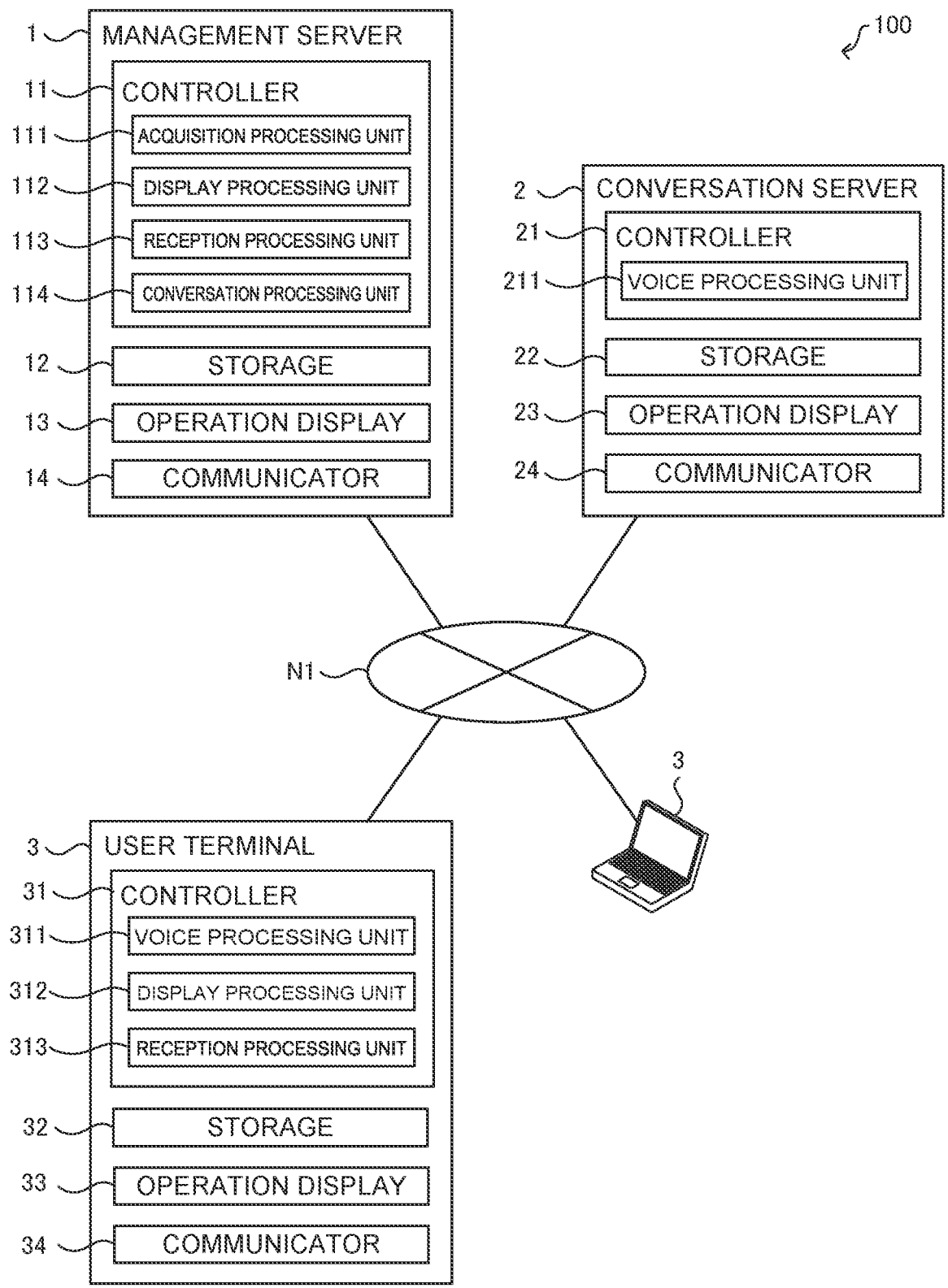
FIG. 2 is a functional block diagram illustrating a configuration of the virtual office system according to the embodiment of the present disclosure.

Conversation Server 2 As illustrated in FIG. 2, the conversation server 2 includes a controller 21, a storage 22, an operation display 23, a communicator 24. The conversation server 2 may be one or a plurality of virtual servers (cloud servers) or may be one or a plurality of physical servers.

The communicator 24 is a communicator for connecting the conversation server 2 to the network N1 by wired or wirelessly and for executing data communication according to a predetermined communication protocol with other devices (e.g., the management server 1, the user terminal 3, and the like) via the network N1.

The operation display 23 is a user interface including a display such as a liquid crystal display and an organic EL display, which displays various types of information, and an operation acceptor such as a mouse, a keyboard, and a touch panel, which receives operation.

The storage 22 is a non-volatile storage such as a hard disk drive (HDD), a solid state drive (SSD), and a flash memory, which stores various types of information. The storage 22 stores a control program for causing the controller 21 to execute various types of control processes. For example, the control program is non-temporarily recorded on a computer-readable recording medium such as a CD and a DVD, and is read by a reading device (not illustrated) such as a CD drive and a DVD drive provided by the conversation server 2 and stored in the storage 22. The control program may be distributed from a cloud server and stored in the storage 22.

In addition, the storage 22 stores therein an online meeting program for executing an online meeting service. The online meeting program causes the online meeting to be executed in response to the execution of the virtual office application installed on each user terminal 3. The conversation server 2 of this embodiment provides an online meeting service for the virtual office application, which is one of general-purpose software.

The storage 22 stores therein user information (such as user IDs and passwords) related to users who can use the virtual office application.

The controller 21 has control devices such as a CPU, a ROM, and a RAM. The CPU is a processor that executes various types of arithmetic processes. The ROM stores in advance a control program such as a BIOS and an OS for causing the CPU to execute various types of processes. The RAM stores various types of information and is used as a temporary storage memory (work area) for the various types of processes executed by the CPU. The controller 21 controls the conversation server 2 by causing the CPU to execute various control programs stored in advance in the ROM or the storage 22.

Specifically, the controller 21 includes various types of processing units such as a voice processing unit 211. The controller 21 functions as the various types of processing units by executing the various types of processes according to the control program. Moreover, some or all of the processing units included in the controller 21 may be configured by an electronic circuit. The control program may be a program that causes a plurality of processors to function as the various types of the processing units described above.

The voice processing unit 211 executes the virtual office application to run on each of the plurality of user terminals 3 to have online conversation. Specifically, the voice processing unit 211 starts the online conversation on the basis of login information acquired from each user terminal 3. For example, when a user A activates the virtual office application on a user terminal 3a and performs a login operation, the user terminal 3a transmits login information including an user ID and a password to the conversation server 2. When the voice processing unit 211 acquires the login information from the user terminal 3a and the authenticates user A, the aforementioned online conversation is started.

For example, when the user A terminates the virtual office application (terminates the online meeting) at the user terminal 3a, the user terminal 3a transmits a termination request to the conversation server 2. When the voice processing unit 211 acquires the termination request from the user terminal 3a, the online meeting is terminated (logged off).

Each of a plurality of users who wishes to participate in the online meeting logs into the virtual office application at his/her own user terminal 3. The users who are logged into the virtual office application and authenticated can each have conversation with other users in the virtual space (virtual meeting room) set up by the virtual office application by operating his/her own user icon. For example, when a distance between the plurality of user icons in the virtual space is less than a predetermined distance, the voice processing unit 211 starts transmitting and receiving voice between the plurality of user terminals 3 corresponding to the plurality of user icons, thereby enabling conversation among the plurality of users. The voice processing unit 211 also adjusts the volume in accordance with the distance between the plurality of users icon.

User Terminal 3

As illustrated in FIG. 2, the user terminal 3 includes a controller 31, a storage 32, an operation display 33, a communicator 34, and the like. The user terminal 3 is an information processing device such as a laptop computer, a smartphone, and a tablet device. The user terminals 3 may have the same configuration.

The communicator 34 is a communicator for connecting the user terminal 3 to the network N1 by wired or wirelessly and for executing data communication according to a predetermined communication protocol with other devices (e.g., the management server 1, the conversation server 2, and the like) via the network N1.

The operation display 33 is a user interface including a display such as a liquid crystal display and an organic EL display, which displays various types of information, and an operation acceptor such as a mouse, a keyboard, and a touch panel, which receives operation. The operation display 33 receives operation by a user.

The storage 32 is a non-volatile storage such as an HDD, an SSD, and a flash memory, which stores various types of information. The storage 32 stores a control program for causing the controller 31 to execute various types of control processes. For example, the control program is non-temporarily recorded on a computer-readable recording medium such as a CD and a DVD, and is read by a reading device (not illustrated) such as a CD drive and a DVD drive provided by the user terminal 3 can be stored in the storage 32. The control program may be distributed from a cloud server and stored in the storage 32.

In the storage 32, one or a plurality of virtual office applications for providing an online meeting service are also installed.

The controller 31 has control devices such as a CPU, a ROM, and a RAM. The CPU is a processor that executes various types of arithmetic processes. The ROM stores in advance a control program such as a BIOS and an OS for causing the CPU to execute various types of processes. The RAM stores various types of information and is used as a temporary storage memory (work area) for the various types of processes executed by the CPU. The controller 31 controls the user terminal 3 by causing the CPU to execute the various control programs stored in the ROM or the storage 32 in advance. In addition, the controller 31 functions as a processing unit that executes the virtual office application.

Specifically, the controller 31 includes various types of processing units such as a voice processing unit 311, a display processing unit 312, and a reception processing unit 313. The controller 31 functions as the various types of processing units by causing the CPU to execute the various types of processes according to the control program. Moreover, some or all of the processing units included in the controller 31 may be configured by an electronic circuit. The control program may be a program that causes a plurality of processors to function as the various types of the processing units described above.

Figure 5:
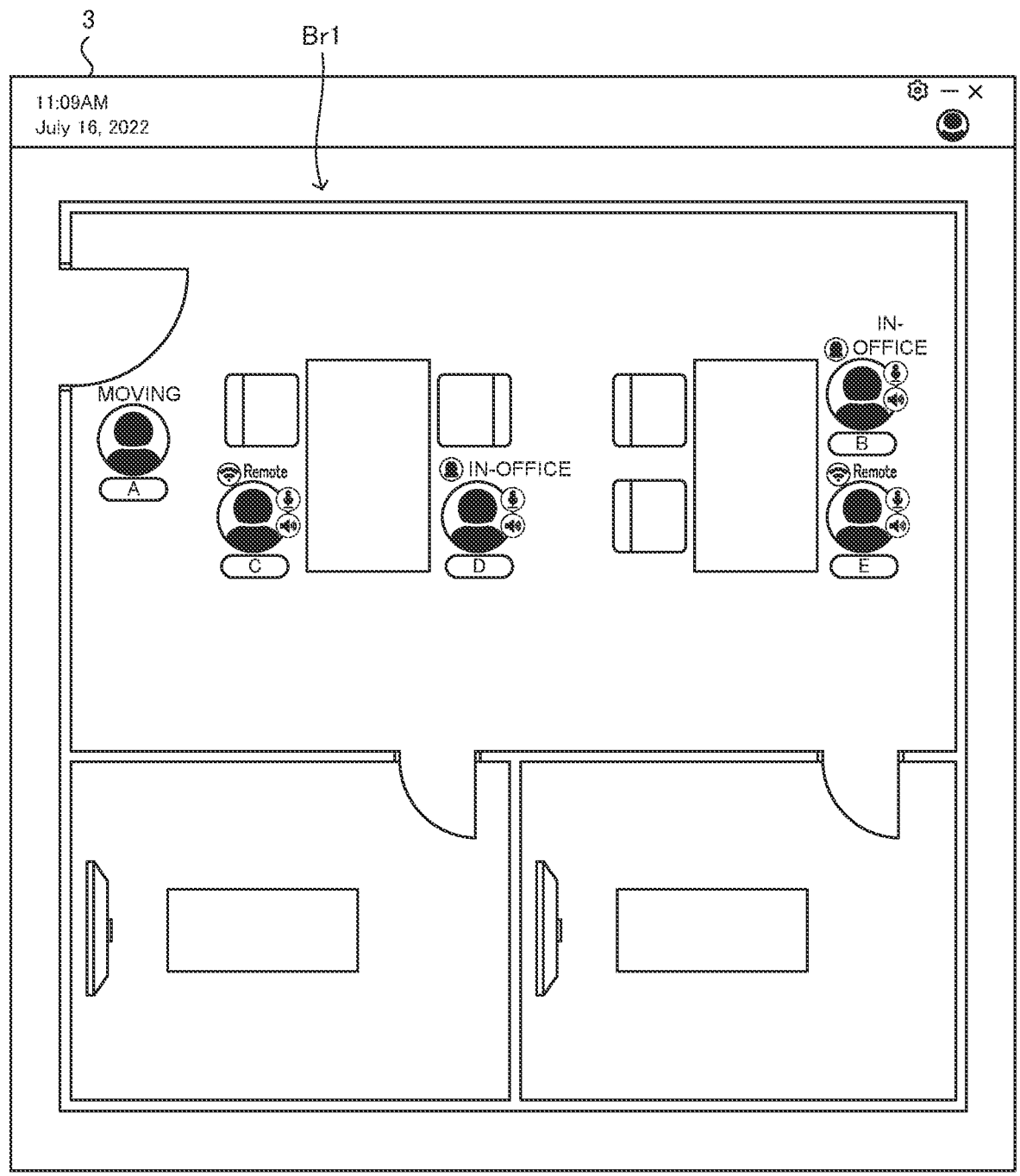
FIG. 5 is a diagram illustrating an example of an operation screen displayed on a user terminal according to the embodiment of the present disclosure.

The voice processing unit 311 performs various types of processes related to the online meeting according to the virtual office application. Specifically, when the voice processing unit 311 receives operation for activating the virtual office application by the user (login operation), the voice processing unit 311 transmits a start request to the conversation server 2. When the conversation server 2 authenticates to the start request, the voice processing unit 311 displays an operation screen on the user terminal 3 to start the online meeting. FIG. 5 illustrates an example of the operation screen corresponding to the virtual office application (online meeting service).

Figure 6A:
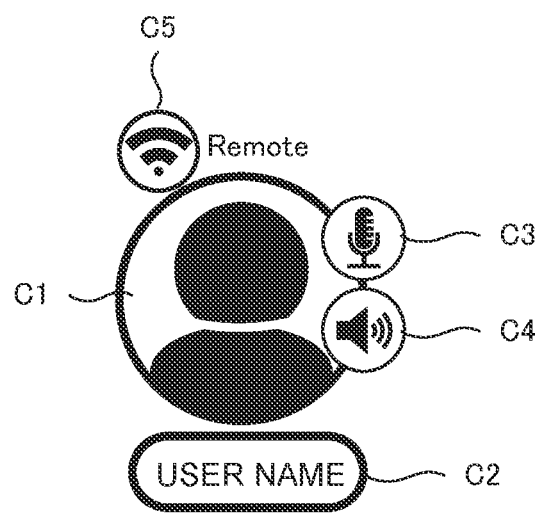
FIG. 6A is a diagram illustrating a display example of a user icon according to the embodiment of the present disclosure.
Figure 6B:
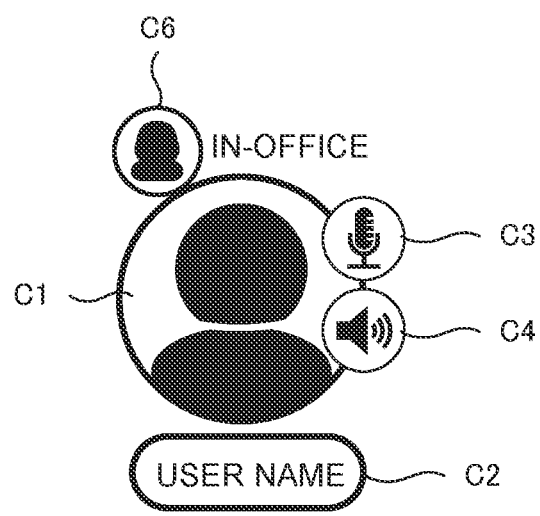
FIG. 6B is a diagram illustrating a display example of the user icon according to the embodiment of the present disclosure.

As illustrated in FIG. 5, on the operation screen, the display processing unit 312 displays, in virtual space, a virtual office Br1 corresponding to the office R1 in real space (see FIG. 1). The display processing unit 312 also displays a user icon that can identify the user in the virtual space. FIG. 6A and FIG. 6B each illustrate a specific example of the user icon. As illustrated in FIG. 6A, the user icon include a face image C1 such as a photo and illustration of the user, a user name C2, a microphone icon C3 that is displayed when the user logs into the virtual office application and can use a microphone, a speaker icon C4 that is displayed when the user logs into the virtual office application and can use a speaker, and a remote icon C5 that is displayed when the user logs into the virtual office application at a remote location outside the office such as his/her home. In addition, in a case where the user logs into the virtual office application in the office R1, an in-office icon C6 is displayed in place of the remote icon C5, as illustrated in FIG. 6B.

The display processing unit 312 changes a display mode of the user icon on the basis of a login state and position information of the user. The example illustrated in FIG. 6A illustrates a state in which a user logs into the virtual office application at the home R2 or R3 (see FIG. 1) (remote icon C5), and the example illustrated in FIG. 6B illustrates a state in which a user logs into the virtual office application at the office R1 (see FIG. 1) (in-office icon C6). In the examples illustrated in FIG. 6A and FIG. 6B, each user is able to use the microphone and the speaker (ON state) and is available for conversation (the microphone icon C3 and the speaker icon C4).

The display processing unit 312 displays the operation screen on the operation display 33 in response to an instruction from the management server 1. Each user can view the operation screen illustrated in FIG. 5 on his/her own user terminal 3. Therefore, each user can grasp in real time status information such as whether or not any other users are in the office, whether or not other users are at the office or at their home, and whether or not other users are available for conversation.

The reception processing unit 313 receives various types of operations from the user. For example, the reception processing unit 313 receives moving operation of the user icon from the user in the virtual space included in the operation screen (see FIG. 5) displayed on the operation display 33. The reception processing unit 313 outputs information on the received user operation to the management server 1.

When the reception processing unit 313 receives the moving operation of the user icon, the display processing unit 312 moves a position of the user icon on the operation screen and displays the user icon. The user can move his/her own user icon to a desired position on the operation screen by drag-and-drop operation, or the like.

The voice processing unit 311 transmits and receives conversation voice through the conversation server 2 when a distance between adjacent two user icons is less than the predetermined distance. For example, when a distance between a user icon a2 of the user A and a user icon c1 of a user C is less than the predetermined distance (see FIG. 9), the voice processing unit 311 of the user terminal 3a of the user A acquires speech voice of the user A through the microphone and transmits the speech voice to the conversation server 2, the conversation server 2 transmits the speech voice of the user A to the user terminal 3c of the user C, and a voice processing unit 311 of the user terminal 3c outputs the speech voice of the user A through a speaker. The voice processing unit 311 of the user terminal 3c of the user C acquires speech voice of the user C through a microphone, the voice processing unit 311 transmits the speech voice of the user C to the conversation server 2, the conversation server 2 transmits the speech voice of the user C to the user terminal 3a of the user A, and the voice processing unit 311 of the user terminal 3a outputs the speech voice of the user C from the speaker. Thus, the user A and the user C can have conversation (online meeting) in the virtual office.

In this embodiment, the configuration example in which the transmission/reception of conversation voice is started depending on the distance between the icons is described. However, the trigger for starting the transmission/reception of conversation voice is not limited to the distance between the icons, and transmission/reception of conversation voice may be started with action (user operation) such as double-clicking of another user icon as a trigger.

When the reception processing unit 313 receives operation for terminating the virtual office application (termination operation) from the user, the voice processing unit 311 transmits a termination request to the conversation server 2. When the conversation server 2 authenticates to the termination request, the voice processing unit 311 terminates the online meeting on the user terminal 3.

Each of the users who participate in the online meeting activates the virtual office application on his/her own user terminal 3 to start the online meeting. Each of the users terminates the online meeting by terminating the virtual office application on his/her own user terminal 3.

Management Server 1

As illustrated in FIG. 2, the management server 1 includes a controller 11, a storage 12, an operation display 13, a communicator 14 and the like. The management server 1 may be one or a plurality of virtual servers (cloud servers) or may be one or a plurality of physical servers.

The communicator 14 is a communicator for connecting the management server 1 to the network N1 by wired or wirelessly and for executing data communication according to a predetermined communication protocol with other devices (e.g., the conversation server 2, the user terminal 3, and the like) via the network N1.

The operation display 13 is a user interface including a display such as a liquid crystal display and an organic EL display, which displays various types of information, and an operation acceptor such as a mouse, a keyboard, and a touch panel, which receives operation.

The storage 12 is a non-volatile storage such as an HDD, an SSD, and a flash memory, which stores various types of information. The storage 12 stores a control program such as a conversation control program for causing the controller 11 to execute a conversation control process (see FIG. 14) described later. For example, the conversation control program is non-temporarily recorded on a computer-readable recording medium such as a CD and a DVD, is read by a reading device (not illustrated) such as a CD drive and a DVD drive provided by the management server 1, and is stored in the storage 12. The conversation control program may be distributed from a cloud server and stored in the storage 12.

In addition, the storage 12 stores therein a management table including various type of information. Specifically, the storage 12 stores data such as a user information management table T1 (seed FIG. 3) for managing information on users who can use the virtual office application, and a setting information management table T2 (see FIG. 4) for managing setting information on the microphone and the speaker of each user who logs in the virtual office application.

As illustrated in FIG. 3, in the user information management table T1, information such as a user name, a user ID, a user position, a user icon position for each user who can use the virtual office application is registered. The user name and the user ID are used as login information of the virtual office application. The user position is information indicating a current position of a user in a real space. The controller 11 resisters the user information management table T1, when the controller 11 acquires position information of the current position of the user.

Figure 7:
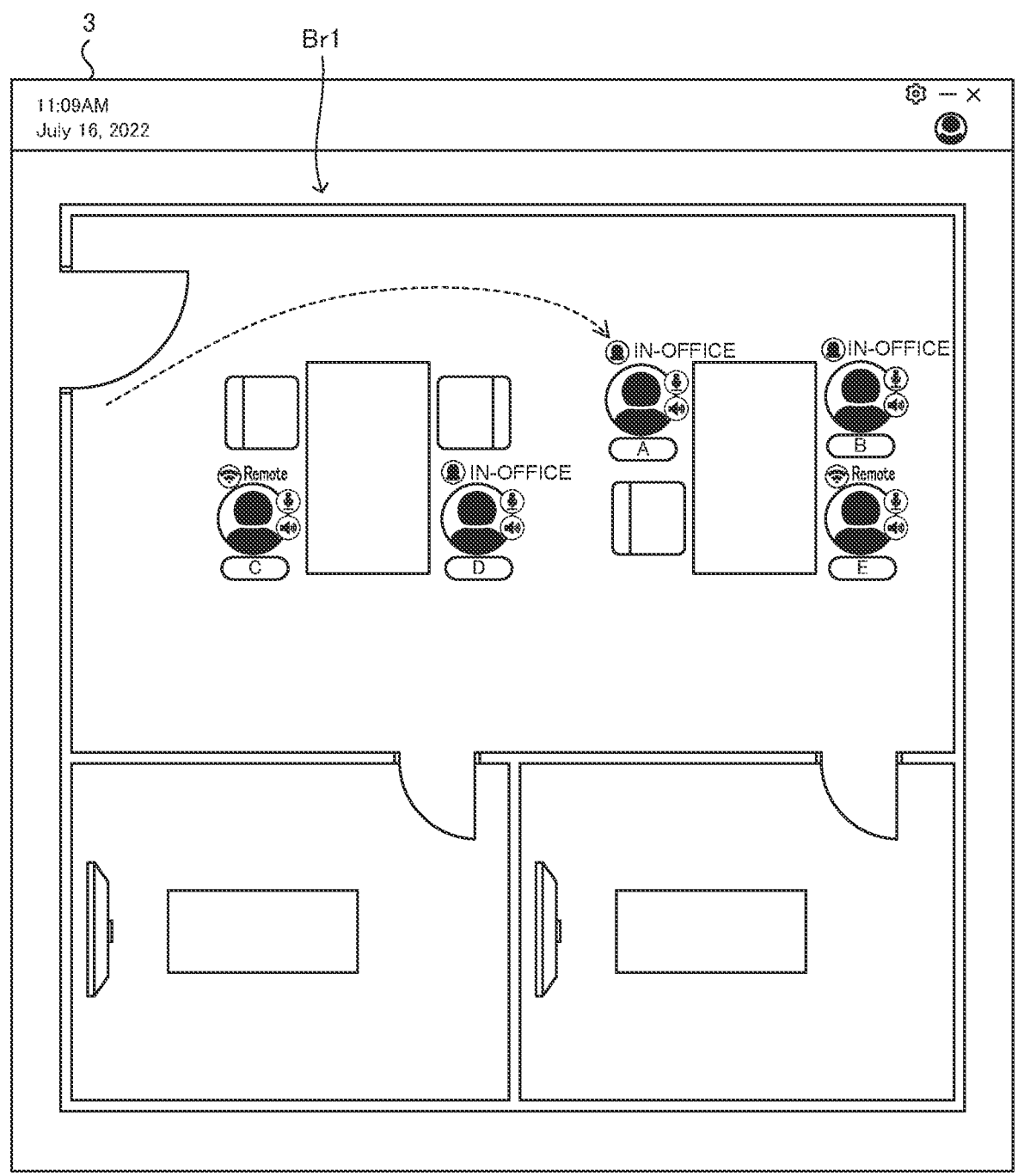
FIG. 7 is a diagram illustrating an example of the operation screen displayed on the user terminal according to the embodiment of the present disclosure.

The user icon position is information indicating a position of a user icon in the virtual space. For example, when the user A logs into the virtual office application, the user icon of the user A is displayed in the virtual space on the operation screen (see FIG. 7 and the like). The operation screen also displays a user icon for each of the plurality of logged-in users. FIG. 7 illustrates a user icon for each of users A through E who logs into the virtual office application. The controller 11 acquires the positions of the user icons in the virtual space and registers the acquired positions in the user information management table T1. In a case where the user is in the office R1, the controller 11 registers the position in the virtual office Br1 corresponding to the current position in the office R1 (the above user position) as the above user icon position. For example, in a case where the user A is present (seated) at his/her seat in the office R1, the controller 11 displays the user icon at the position of a seat icon of the user A in the virtual office Br1, as illustrated in FIG. 7. A specific display method for a user icon will be described below.

As illustrated in FIG. 4, information such as the user name, the user ID, the microphone setting, and the speaker setting of each user who logs into the virtual office application is registered in the setting information management table T2. The microphone setting and the speaker setting are information indicating the setting state of the microphone and the speaker settings of each user terminal 3. For example, when the user sets the microphone and the speaker to the ON state, "ON" is registered in the microphone setting and the speaker setting in the setting information management table T2. For example, when the user sets the microphone and the speaker to the OFF state (mute), "OFF" is registered in the microphone setting and the speaker setting in the setting information management table T2.

Part or all of the user information management table T1 and the setting information management table T2 may be stored in other server.

The controller 11 has control devices such as a CPU, a ROM, and a RAM. The CPU is a processor that executes various types of arithmetic processes. The ROM stores in advance a control program such as a BIOS and an OS for causing the CPU to execute various types of processes. The RAM stores various types of information and is used as a temporary storage memory (work area) for the various types of processes executed by the CPU. The controller 11 controls the management server 1 by causing the CPU to execute various control programs stored in advance in the ROM or the storage 12.

Specifically, the controller 11 includes various processing units such as an acquisition processing unit 111, a display processing unit 112, a reception processing unit 113, and a conversation processing unit 114. The controller 11 functions as the above various processing units by executing various processes according to the conversation control program. Furthermore, some or all of the processing units included in the controller 11 may be configured by an electronic circuit. The conversation control program may be a program for making a plurality of processors function as the various processing units described above.

The acquisition processing unit 111 acquires the current position of each user in the real space. For example, the acquisition processing unit 111 acquires the current position of the user on the basis of the position information of the user terminal 3 (such as a laptop computer) or a mobile terminal (such as a smartphone) different from the user terminal 3 possessed by the user. The acquisition processing unit 111 may also acquire the current position of the user on the basis of a result of communication between a communication medium, such as an IC card and an IC tag possessed by the user, and a communication device (receiver) such as a beacon installed in the office R1. The acquisition processing unit 111 may also acquire the current position of the user on the basis of video from a camera installed in the office R1. The acquisition processing unit 111 registers the acquired position information of the current position of the user, in the user position (see FIG. 3) of the user information management table T1. The acquisition processing unit 111 periodically acquires the current position of the user and updates the information on the user position in the user information management table T1.

The display processing unit 112 displays the user icon of the user at a predetermined position in the virtual space on the basis of the current position of the user in the real space. The display processing unit 112 displays the user icon in a display manner (see FIG. 6A and FIG. 6B) according to the current position of the user, the login state of the virtual office application, the setting states of the microphone and the speaker, and the like. As illustrated in FIG. 5, on the operation screen, the display processing unit 112 displays the virtual office Br1 corresponding to the office R1 in the real space, in the virtual space (see FIG. 1). The display processing unit 112 is an example of a first display processing unit and a second display processing unit in the present disclosure.

The display processing unit 112 displays a user icon that can identify the user in the virtual space, at a position corresponding to the current position of the user in the real space. For example, in a case where the user B who comes to work in the office R1 is present (seated) at his/her seat in the office R1, the display processing unit 112 displays the user icon of the user B at a position of a seat icon of the user B in the virtual office Br1, as illustrated in FIG. 5. In addition, for example, in a case where the user C is at his/her home, the display processing unit 112 displays the user icon of the user C at a position of a seat icon of the user C in the virtual office Br1, as illustrated in FIG. 5. The display processing unit 112 may display, in a predetermined area (area for remote work user), the user icon of the user at his/her home.

The display processing unit 112 moves the position of the user icon in the virtual space according to a movement status (change) of the current position of the user in the real space. For example, as illustrated in FIG. 5, when the user A comes to the office R1 and the acquisition processing unit 111 acquires the current position of user A, the display processing unit 112 displays the user icon of the user A in the virtual office Br1. Herein, the display processing unit 112 hides the microphone icon C3 and the speaker icon C4 in the user icon of the user A. When the user A then moves toward his/her own seat in the office R1, the display processing unit 112 displays "moving" information on the user icon and moves the user icon in the virtual office Br1 (see FIG. 5 and FIG. 7). The display processing unit 112 hides the microphone icon C3 and the speaker icon C4 in the user icon with the "moving" information. Then, when the user A is seated at his/her seat and logs into the virtual office application on the user terminal 3a, the display processing unit 112 displays the microphone icon C3, the speaker icon C4, and the in-office icon C6 in the user icon (see FIG. 7). The controller 11 may register, as his/her seat, the current position of the user A in office R1 when the user A logs into the virtual office application on the user terminal 3a in office R1 at the beginning of the day. In a case where the user A sets the microphone and the speaker to mute on the user terminal 3a, the display processing unit 112 displays or hides the microphone icon C3 and the speaker icon C4 in a mute state.

The reception processing unit 113 receives moving operation of the user icon in the virtual space from the user. For example, on the operation screen illustrated in FIG. 8, when the user A performs operation for moving his/her own user icon (drag-and-drop operation), the reception processing unit 113 receives the moving operation from the user terminal 3a.

Figure 8:
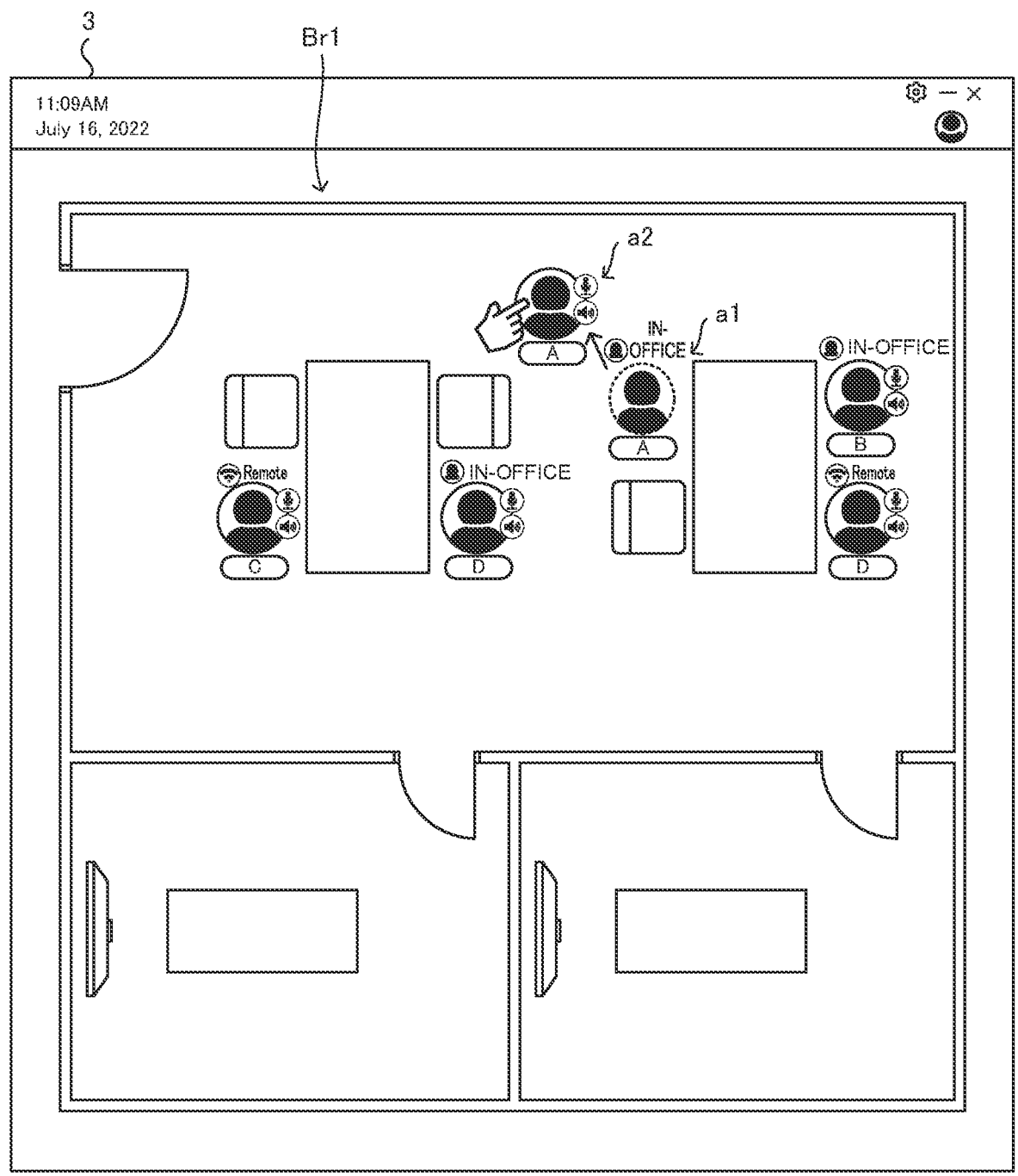
FIG. 8 is a diagram illustrating an example of the operation screen displayed on the user terminal according to the embodiment of the present disclosure.

Herein, in a case where the reception processing unit 113 receives the moving operation of the user icon from the user, the display processing unit 112 displays a user icon corresponding to the moving operation of the user in the virtual space. For example, as illustrated in FIG. 8, when the user A selects his/her own user icon a1 in the virtual office Br1 on the operation screen and operates to move the user icon a1, the display processing unit 112 displays the user icon a2 at a position specified by the user in the virtual office Br1 (position after moving). In addition, the display processing unit 112 displays the user icon a1 at a position corresponding to the current position of the user A in the office R1 (seat of the user A), in the virtual office Br1. Thus, in the virtual office Br1, the display processing unit 112 displays the user icon a2 at the position according to the moving operation of the user A in a state in which the user icon a1 is displayed at the seat of the user A (predetermined position). In other words, the display processing unit 112 separates the user icon of the user A into two separate icons. In addition, the display processing unit 112 displays the user icons a1 and a2 so as to be able to recognize the two separated user icons a1 and a2 as the user icons corresponding to the same user A. The display processing unit 112 moves the user icon a2 in the virtual space in response to the moving operation by the user A.

The display processing unit 112 hides the microphone icon C3 and the speaker icon C4 in the user icon a1 and displays the microphone icon C3 and the speaker icon C4 in the user icon a2. Thus, the display processing unit 112 displays the user icon a1 and the user icon a2 in different display modes.

The display processing unit 112 may also determine whether or not the user icons are separately displayed on the basis of the operation information on the user terminal 3 of the user. For example, the display processing unit 112 may determine whether or not to the user icons are separately displayed on the basis of the presence or absence of input to the operation acceptor of the user terminal 3, a sleep/non-sleep mode of the user terminal, and the on/off state of the user terminal.

Figure 9:
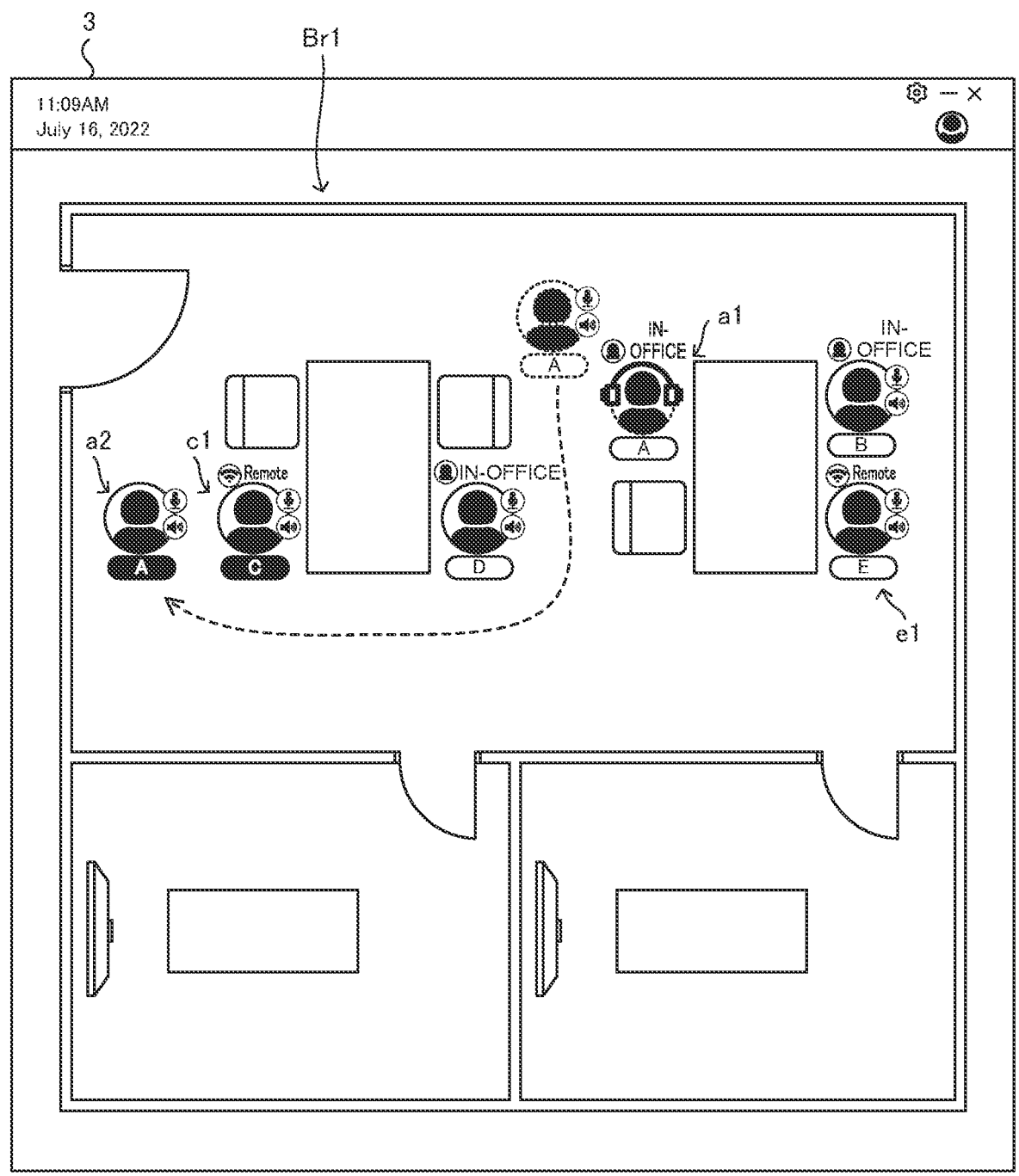
FIG. 9 is a diagram illustrating an example of the operation screen displayed on the user terminal according to the embodiment of the present disclosure.

Herein, for example, as illustrated in FIG. 9, when the user A moves the user icon a2 further to bring the user icon a2 closer to the user icon cl of the user C, and a distance between the user icon a2 and the user icon cl becomes less than a predetermined distance, the conversation processing unit 114 allows the user A and the user C to have conversation.

Specifically, when the distance between the user icon a2 and the user icon cl becomes less than the predetermined distance, the conversation processing unit 114 starts transmitting and receiving speech voice of the user A and the user C between the user terminal 3a and the user terminal 3c to enable conversation between the user A and the user C. Consequently, the user A can have conversation with the user C at a remote location (home) while the user A is seated at his/her own seat in the office R1. In addition, in a case where the distance between the user icon a2 and the user icon cl is less than the predetermined distance, the conversation processing unit 114 increases the volume as the distance is shorter, and conversation processing unit 114 decreases the volume as the distance is longer.

Herein, the display processing unit 112 displays a fact that the user A and the user C are in conversation (in online meeting) in the virtual space in an identifiable manner. Specifically, the display processing unit 112 displays at least one of the user icon a1 and the user icon a2 of the user A such that a conversation status between the user A and the user C can be identified. For example, as illustrated in FIG. 9, the display processing unit 112 displays an icon image illustrating a headphones (headset) on the user icon a1 displayed on the seat of the user A in the virtual office Br1 so as to know that the user A is in conversation. In addition, the display processing unit 112 inverts and displays the user names of the user icon a2 and the user icon cl so as to know that the user A and the user C are in conversation. The information that can identify that the user A and the user C are in conversation is not limited to the example illustrated in FIG. 9, but may be displayed in other display way. Thus, the display processing unit 112 displays the status information (e.g., in conversation) of the user A in each of the two user icons a1 and a2 corresponding to the user A. The status information may be information that the user is moving in the real space, that the user is busy, or that the user is away from his/her seat. The controller 11 may also estimate the degree of concentration on the basis of biometric information of the user to determine busyness state or other state.

According to the above configuration, for example, each user can easily recognize that the user A is at his/her seat in the office R1 and that the user A is in an online meeting with the user C at his/her seat by viewing the operation screen illustrated in FIG. 9.

Herein, in the state illustrated in FIG. 9, for example, when the user E at home moves a user icon el of the user E to a position, which is less than the predetermined distance from the user icon a1, in the virtual office Br1 in order to have conversation with the user A, the conversation processing unit 114 may notify the user A of information indicating that a conversation request is received from the user E. Specifically, in a case where the user A is in conversation with the user C in the virtual space, when the user icon el moves to the position which is less than the predetermined distance from the user icon a1, the conversation processing unit 114 receives the conversation request to the user A from the user E. When the conversation processing unit 114 receives the conversation request, the conversation processing unit 114 notifies the user E that it is not possible to have conversation with the user A (or that the user A is in conversation with the user C) and notifies the user A that the conversation request is received from the user E.

For example, in a case where the user icon a2 moves away from the user icon cl by the predetermined distance or more, and a state in which the conversation with the user A is not possible is changed to a state in which the conversation with the user A is possible, the conversation processing unit 114 displays the user icon a2 in the virtual space so as to be able to identify that the conversation with the user A is possible, and notifies the user E who makes the conversation request of information indicating that the conversation with the user A is possible.

Figure 10:
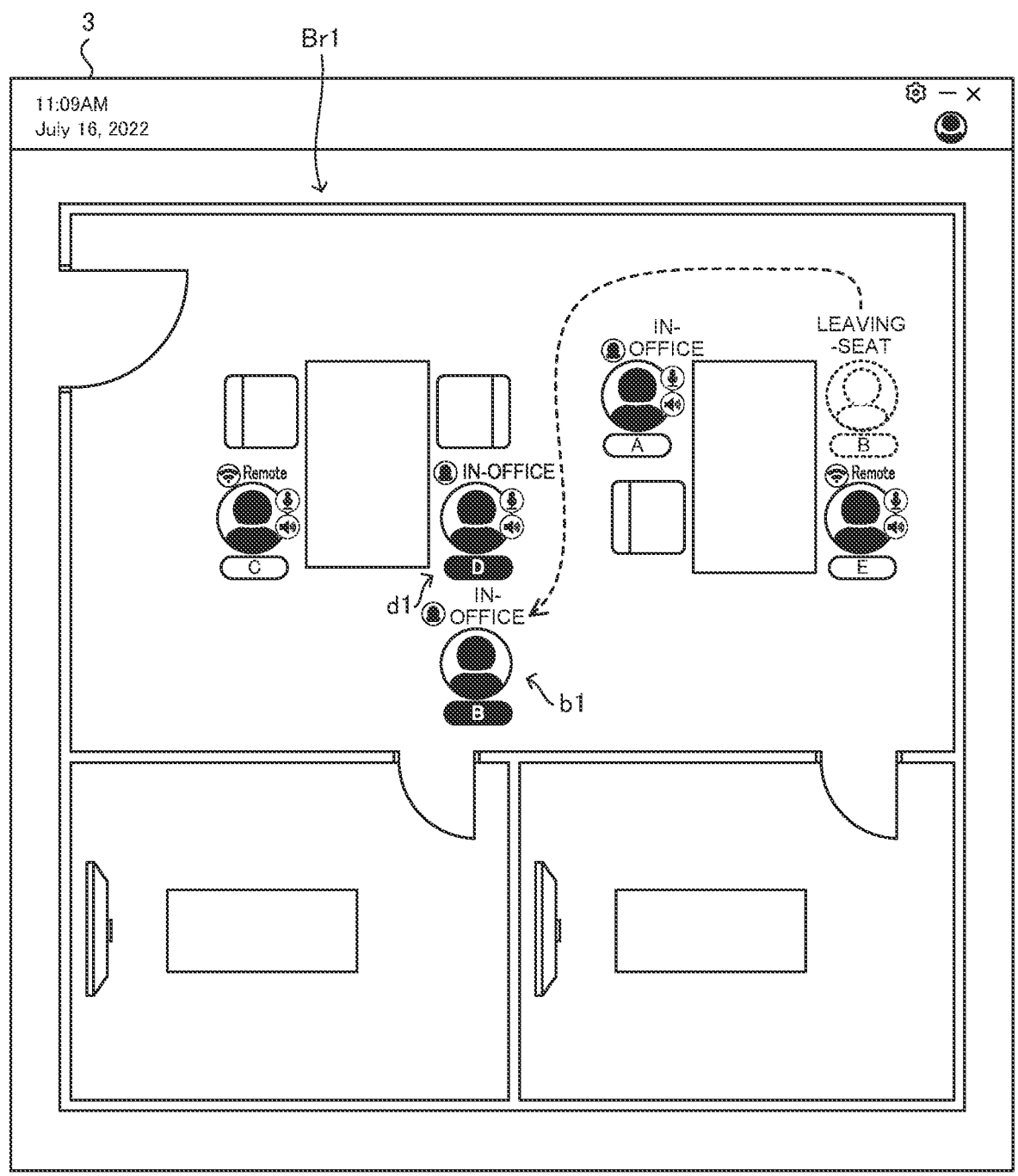
FIG. 10 is a diagram illustrating an example of the operation screen displayed on the user terminal according to the embodiment of the present disclosure.

As another example, a case where users have conversation in the office R1 is considered. For example, as illustrated in FIG. 10, the user B in the office R1 may leave his/her PC (user terminal 3b) at his/her seat and walk from his/her seat to a seat of the user D in order to have conversation with the user D in the office R1. In this case, the display processing unit 112 moves a user icon b1 in the virtual space (virtual office Br1) in response to change in the current position of the user B in the real space. For example, the display processing unit 112 acquires the current position of the user B on the basis of the position information of the mobile terminal (e.g., smartphone) possessed by the user B, and displays the user icon b1 at the position corresponding to the position information in the virtual space. At this time, since operation on the PC (user terminal 3b) for activating the virtual office application is not performed for a certain period of time or more, the conversation processing unit 114 assumes that conversation is not possible on the virtual office application, and the display processing unit 112 hides the microphone icons C3 and the speaker icon C4 in the user icon b1 (see FIG. 10). The display processing unit 112 displays information indicating that the user B is away from his/her seat in the virtual office Br1. In addition, the display processing unit 112 may also display a grayed-out (or black and white) user icon of the user B at the position of the seat of the user B. In this case, the display processing unit 112 hides the microphone icon C3 and the speaker icon C4 in the grayed-out user icon.

According to the configuration illustrated in FIG. 10, each user can easily recognize from the operation screen that the user B is not at his/her seat in the office R1 and that the user B and the user D are in conversation in the office R1. As illustrated in FIG. 10, the display processing unit 112 may invert and display the user names of the user icon b1 and a user icon dl on the operation screen so as to know that the user B and the user D are in conversation in the office R1. In a case where a distance between the user B and the user D in the real space (office R1) is less than the predetermined distance for a predetermined period of time or more, the display processing unit 112 may determine that the user B and the user D are in conversation and change the display content of the user icon b1 and the user icon dl.

Figure 11:
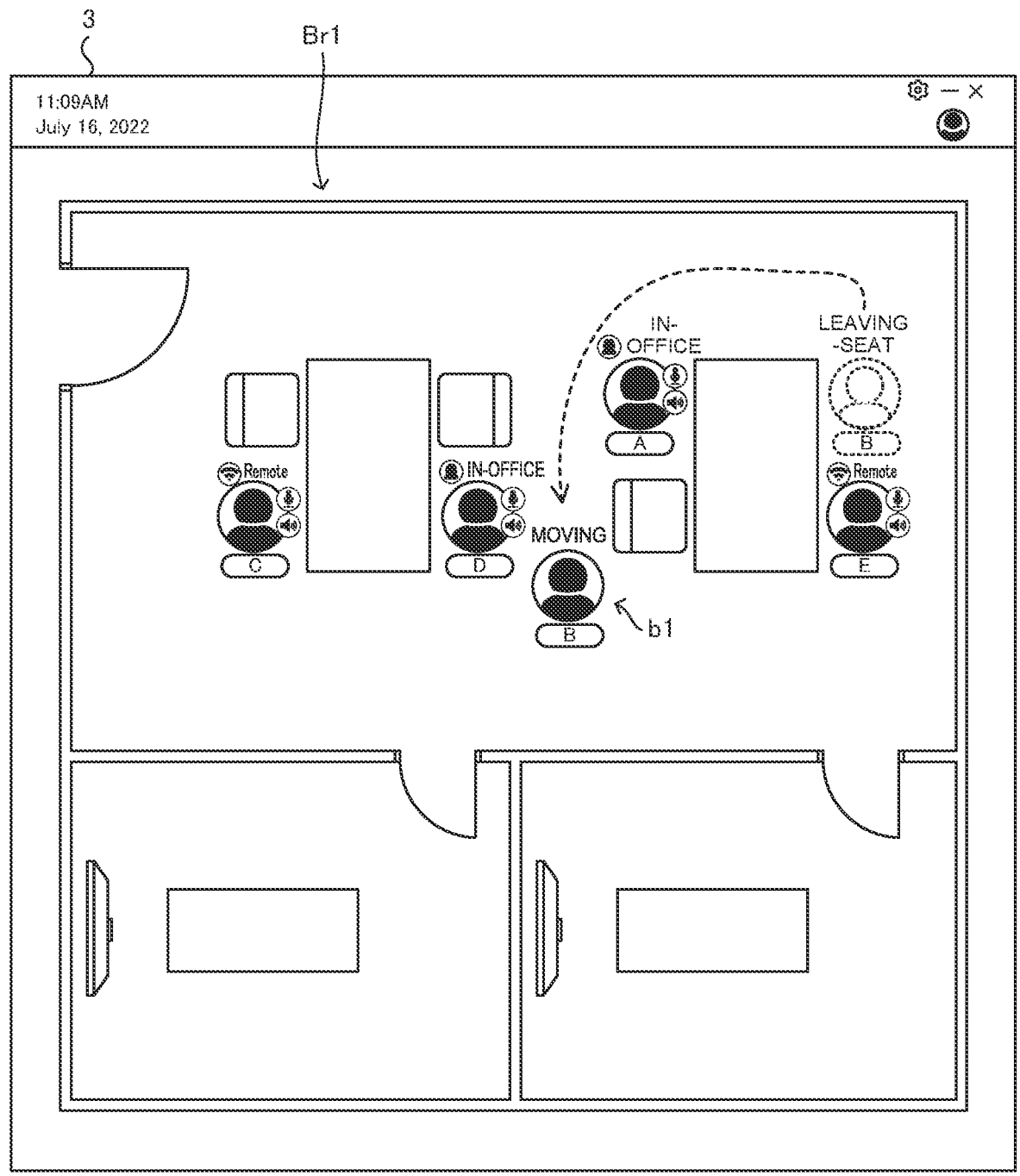
FIG. 11 is a diagram illustrating an example of the operation screen displayed on the user terminal according to the embodiment of the present disclosure.

As another example, a case where a user in the office R1 moves to a meeting room to have conversation with the user E in a remote location (e.g., at home). For example, as illustrated in FIG. 11, the user B comes to work in the office R1, logs into the virtual office application (see FIG. 5), and then logs off temporarily and moves to the meeting room. When the user B logs off from the virtual office application on the user terminal 3b, the display processing unit 112 removes or mutes the microphone icon C3 and the speaker icon C4 from the user icon of the user B. While the user B is moving from his/her seat to the meeting room in the office R1, the display processing unit 112 moves the user icon b1 on the basis of the current position of the user B in the virtual office Br1, as illustrated in FIG. 11. In addition, the display processing unit 112 adds the "moving" information to the user icon b1.

Figure 12:
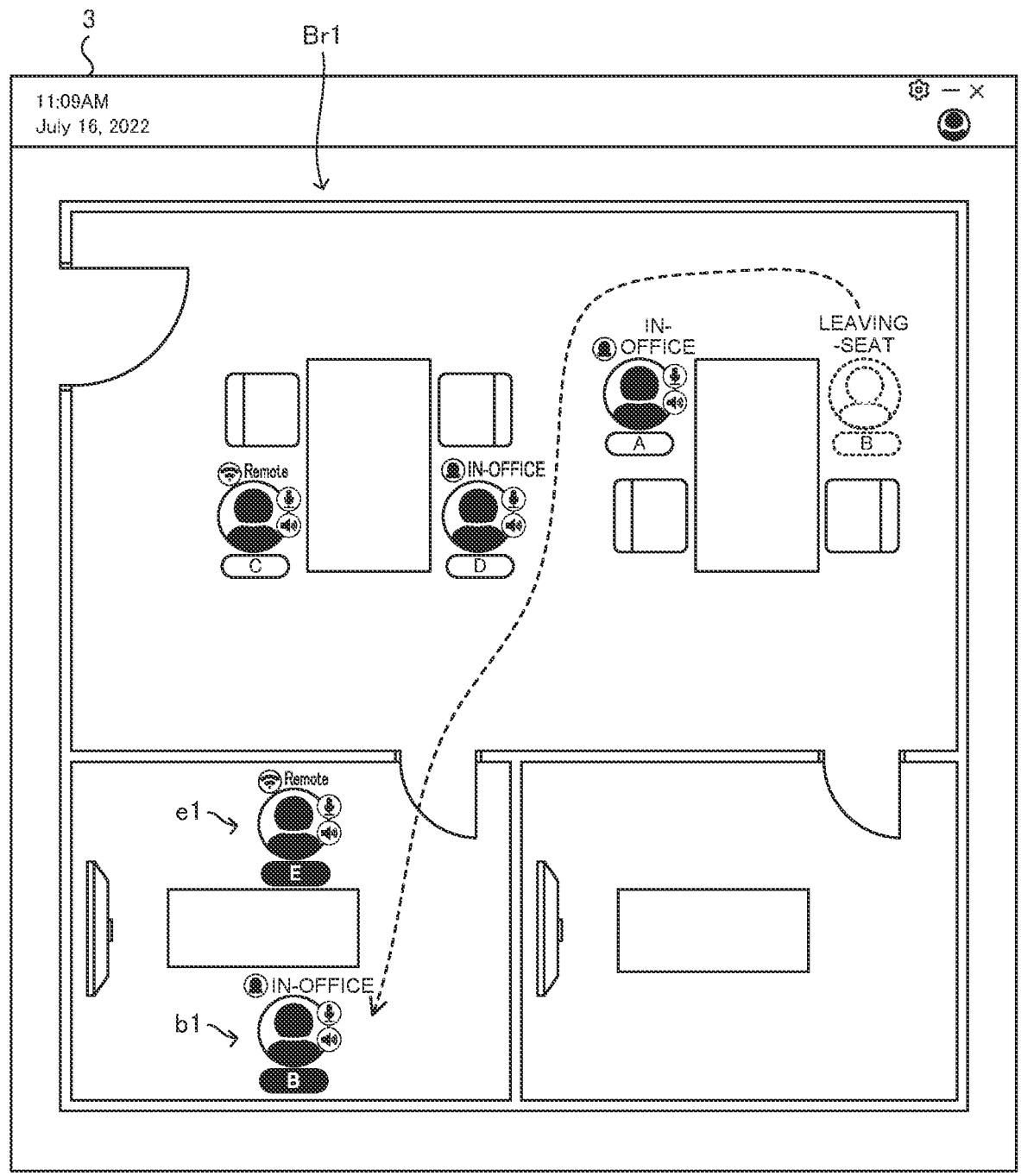
FIG. 12 is a diagram illustrating an example of the operation screen displayed on the user terminal according to the embodiment of the present disclosure.

When the user B enters the meeting room in the office R1, the display processing unit 112 displays the user icon b1 of the user B in a virtual meeting room corresponding to the meeting room in the office R1 in the virtual office Br1 (see FIG. 12). When the user B logs into the virtual office application on the user terminal 3b, the display processing unit 112 displays the microphone icon C3 and the speaker icon C4 in the user icon b1 of the user B.

The user E who is at home also moves the user icon el in the virtual office Br1 to the virtual meeting room (see FIG. 12). When the user icon b1 and the user icon el are located in the same virtual meeting room, and a distance between the user icon b1 and the user icon el becomes less than the predetermined distance, the conversation processing unit 114 enables conversation between the user B and the user E.

According to the configuration illustrated in FIG. 12, each user can easily recognize that the user B is not at his/her seat in the office R1, that the user B is in the meeting room in the office R1, and that the user B and the user E are in an online meeting by viewing the operation screen.

Figure 13:
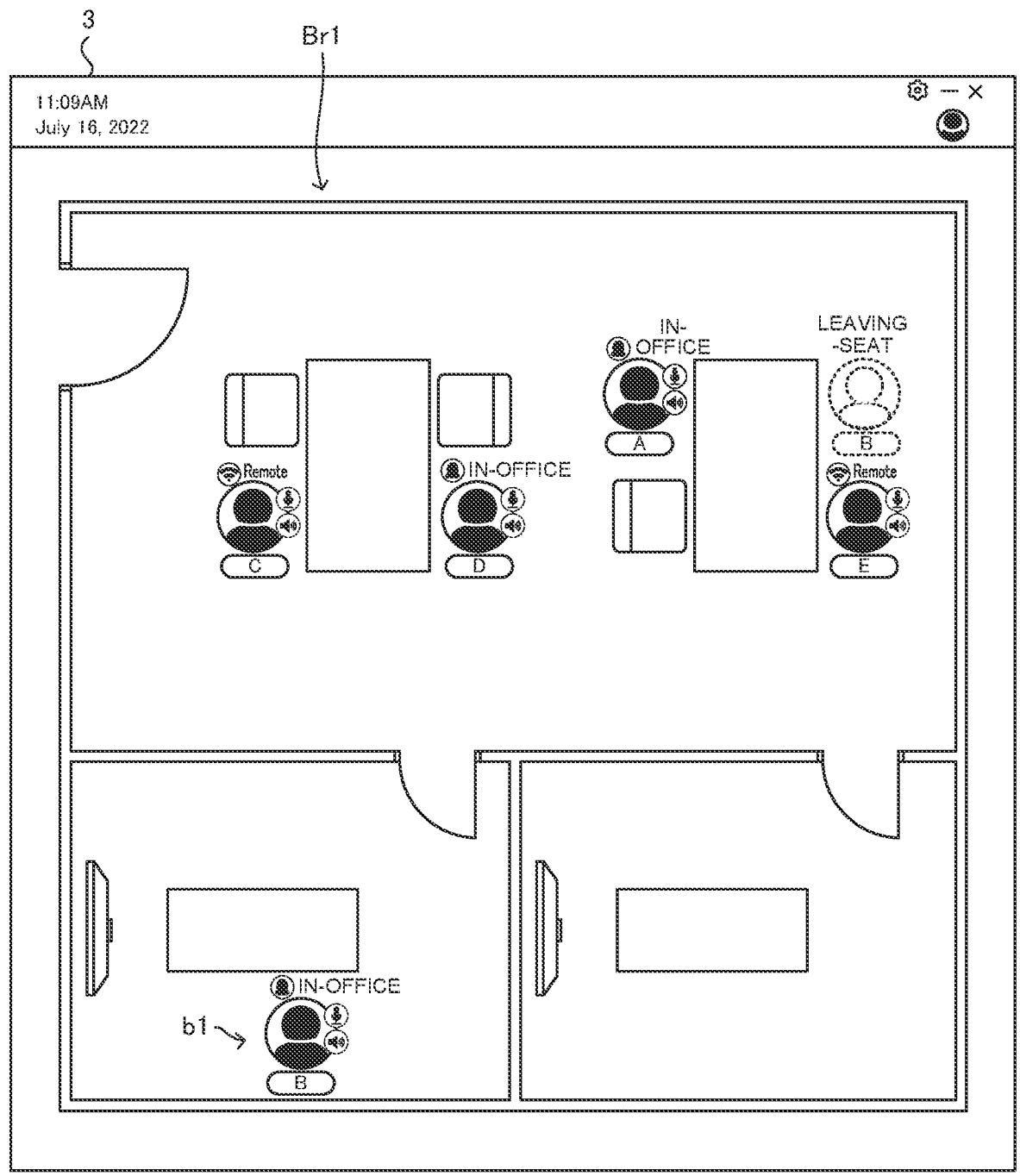
FIG. 13 is a diagram illustrating an example of the operation screen displayed on the user terminal according to the embodiment of the present disclosure.

When the user E moves the user icon el out of the virtual meeting room (leaves the meeting room) in the state illustrated in FIG. 12, the display processing unit 112 displays the user icon b1 so as to be able to identify that the user B is available for conversation as illustrated in FIG. 13. Consequently, each user can easily grasp that the user B in the meeting room of the office R1 is available for conversation.

Conversation Control Process

Figure 14:
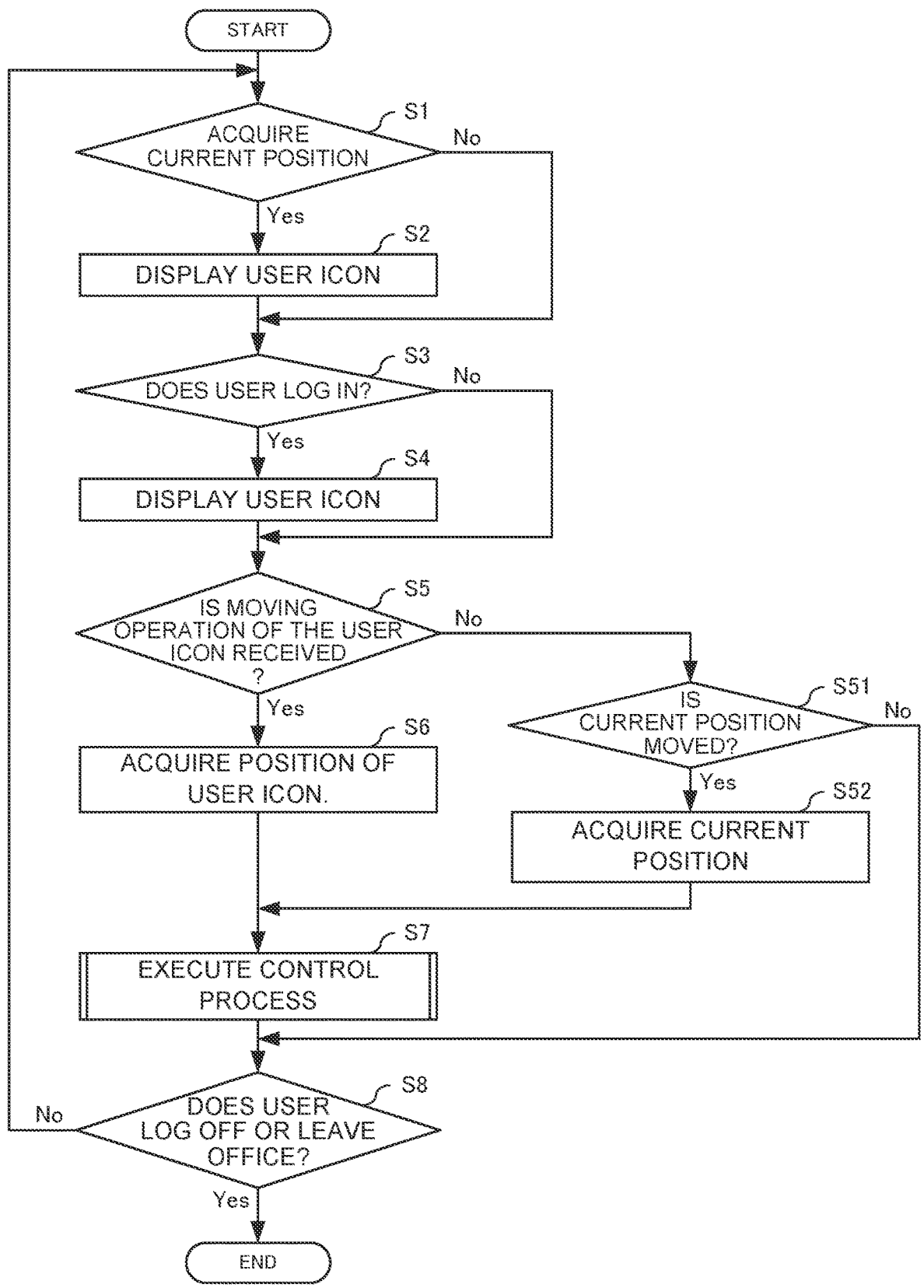
FIG. 14 is a flowchart for illustrating an example of a procedure of a conversation control process executed in the virtual office system according to the embodiment of the present disclosure.

Hereinafter, an example of the procedure of the conversation control process executed in the virtual office system 100 will be described with reference to FIG. 14.

The present disclosure can be grasped as a conversation control method (an example of a display control method of the present disclosure) for executing one or a plurality of steps included in the above conversation control process. In addition, one or a plurality of steps included in the aforementioned conversation control process described herein may be omitted as appropriate. The order of execution of each step in the aforementioned conversation control process may differ to such an extent that similar effects are produced.

Although a case where the controller 11 of the management server 1 executes each step in the aforementioned conversation control process is described herein as an example, in other embodiments, one or s plurality of processors may distribute and execute each step in the aforementioned conversation control process.

First, in Step S1, the controller 11 acquires the current position of each user. For example, the controller 11 acquires the current position of each user by using the position information of the user terminal 3, the mobile terminal, or other device possessed by the user. Specifically, the controller 11 acquires the current position of each user by using existing indoor positioning technology, for example, possessing a device such as a mobile terminal for indoor positioning or a tag such as RFID, and installing a BLE beacon, Wi-Fi (registered trademark), and a sensor indoors. The controller 11 registers the acquired position information of the current positions in the user information management table T1 (see FIG. 3). In a case where the controller 11 detects that a user arrives to work at the office R1, the controller 11 may acquire the current position of the user. In this case, the controller 11 may omit acquisition of the current position of a user who does not come to work at the office R1. In addition, in a case where the controller 11 logs into the virtual office application outside the office R1, the controller 11 may register the current position of the user as his/her home in the user information management table T1. When the controller 11 acquires the current position of the user (Yes in S1), the controller 11 shifts the process to Step S2. On the other hand, in a case where the controller 11 does not acquire the current position of the user (No in S1), the controller 11 shifts the process to Step S3.

In Step S2, the controller 11 displays the user icon in the virtual space (virtual office Br1). For example, when the user A arrives to work at the office R1, the controller 11 acquires the current position of the user A and displays the user icon of the user A at the position corresponding to the current position in the virtual office Br1 (see FIG. 5). When the user A moves in the office R1, the controller 11 moves the user icon in accordance with change in the current position of the user A in the virtual office Br1.

In Step S3, the controller 11 determines whether or not the user logs into the virtual office application. For example, when the user A arrives at his/her seat in the office R1, activates the virtual office application on the user terminal 3a, and performs login operation, the controller 21 of the conversation server 2 executes a login process (authentication process). When the conversation server 2 authenticates the user A, the controller 11 determines that the user A logs into the virtual office application. For example, when the user C activates the virtual office application on the user terminal 3c at home and performs the login operation, the controller 21 of the conversation server 2 executes the login process (authentication process). When the conversation server 2 authenticates the user C, the controller 11 determines that the user C logs into the virtual office application.

When the controller 11 determines that the user logs into the virtual office application (Yes in S3), the controller 11 shifts the process to Step S4. On the other hand, when the controller 11 determines that the user does not log into the virtual office application (No in S3), the controller 11 shifts the process to Step S5.

When the user logs into the virtual office application, the controller 11 displays the user icon in the virtual space (virtual office Br1). For example, when the user C logs into the virtual office application, the controller 11 displays the user icon of the user C at the position of the seat of the user C in the virtual office Br1 (see FIG. 5). At this time, the controller 11 displays each user icon so as to be able to identify whether or not each user is in the office in the real space or remotely logs into the virtual office (see FIG. 6A and FIG. 6B).

In Step S5, the controller 11 determines whether or not the moving operation of the user icon is received from the user in the virtual space. When the controller 11 receives the moving operation from the user (Yes in S5), the controller 11 shifts the process to Step S6. On the other hand, in a case where the controller 11 does not receive the moving operation from the user (No in S5), the controller 11 shifts the process to Step S51.

In Step S6, the controller 11 acquires the position of the user icon. For example, as illustrated in FIG. 8 and FIG. 9, when the user A moves his/her user icon in the virtual office Br1, the controller 11 acquires the position of the user icon after the move in the virtual office Br1. After Step S6, the controller 11 shifts the process to Step S7.

In Step S51, the controller 11 determines whether or not the position of the user in the real space is moved. For example, when the user B moves from his/her seat to another position in the office R1, the controller 11 determines that the position of the user B in the real space is moved. When the controller 11 determines that the position of the user in the real space is moved (Yes in S51), the controller 11 shifts the process to Step S52. On the other hand, when the controller 11 determines that the position of the user in the real space does not move (No in S51), the controller 11 shifts the process to Step S8.

In Step S52, the controller 11 acquires the post-movement position of the user in the real space. For example, when the user B moves from his/her seat to another position in the office R1, the controller 11 acquires the post-movement current position of the user B in the office R1. After Step S52, the controller 11 shifts the process to Step S7.

In Step S7, the controller 11 executes the control process including a user icon display process and a conversation process. A specific example of the aforementioned control process will be described below.

After Step S7, in Step S8, the controller 11 determines whether or not the user logs off from the virtual office application or leaves the office R1. When the controller 11 determines that the user logs off from the virtual office application or leaves the office R1 (Yes in S8), the conversation control process ends. On the other hand, in a case where the user does not log off the virtual office application and does not leave the office R1 (No in S8), the controller 11 shifts the process to Step S1.

For example, in a case where the user A, who came to work at the office R1, leaves the office R1, the controller 11 ends the conversation control process on the user terminal 3a. In addition, for example, when the user C at home logs off from the virtual office application, the controller 11 ends the conversation control process on the user terminal 3c.

Figure 15:
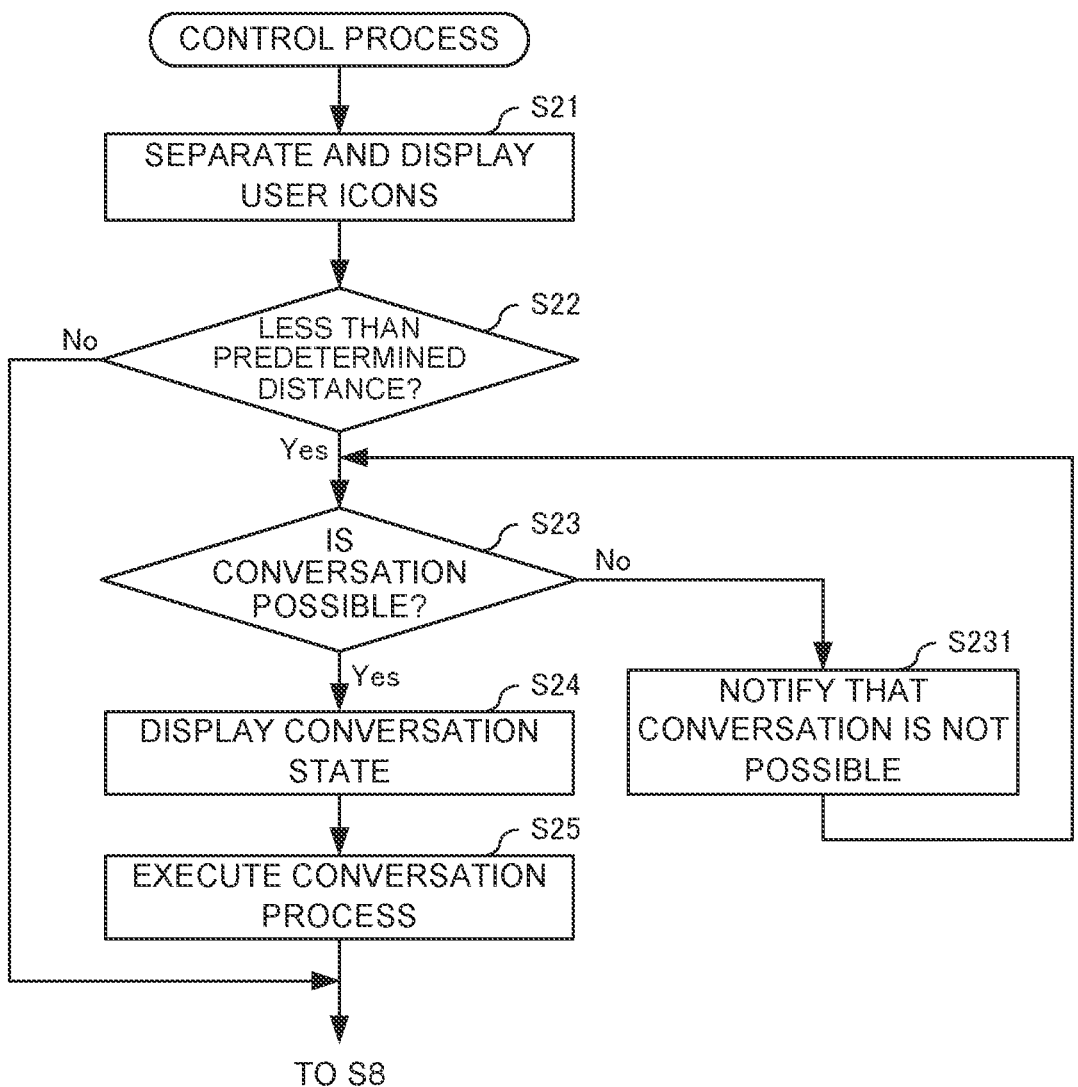
FIG. 15 is a flowchart for illustrating an example of the procedure of the conversation control process executed in the virtual office system according to the embodiment of the present disclosure.

FIG. 15 illustrates an example of the aforementioned control process in Step S7.

In Step S21, the controller 11 separates the user icon and displays the separated user icons in the virtual space. For example, as illustrated in FIG. 8, when the user A selects his/her own user icon a1 in the virtual office Br1 on the operation screen and performs operation for moving the user icon a1, the controller 11 displays the user icon a2 at the position specified by the user (position after moving) in the virtual office Br1, and displays the user icon a1 at the position corresponding to the current position of the user A (seat of the user A). Thus, the controller 11 displays the user icon a2 at the position corresponding to the moving operation by the user A in a state in which the user icon a1 is displayed at the seat of the user A (predetermined position).

Now, in Step S22, the controller 11 determines whether or not the distance between the user icons is less than the predetermined distance. For example, as illustrated in FIG. 9, when the user A moves the user icon a2 further to bring the user icon a2 closer to the user icon c1 of the user C, the controller 11 determines whether or not the distance between the user icon a2 and the user icon c1 is less than the predetermined distance. When the controller 11 determines that the distance between the user icon a2 and the user icon c1 is less than the predetermined distance (Yes in S22), the controller 11 shifts the process to Step S23. On the other hand, when the controller 11 determines that the distance between the user icon a2 and the user icon c1 is the predetermined distance or more (No in S22), the controller 11 shifts the process to Step S8.

In Step S23, the controller 11 determines whether or not the user is available for conversation. For example, the controller 11 determines whether or not the user C with whom the user A wishes to have conversation, is available for conversation. When the controller 11 determines that the user C is available for conversation (Yes in S23), the controller 11 shifts the process to Step S24. On the other hand, when the controller 11 determines that the user C is not available for conversation (No in S23), in Step S231, the controller 11 notifies the user A that conversation with the user C is not possible, and notifies the user C of the information indicating that the conversation request is received from the user A. After Step S231, the controller 11 shifts the process to Step S23.

In Step S24, the controller 11 displays the user icon in the virtual office Br1 so as to be able to distinguish that the user is in conversation. For example, as illustrated in FIG. 9, the controller 11 displays so as to be able to distinguish that the user A and the user C are in conversation (in online meeting).

In Step S25, the controller 11 executes the conversation process. Specifically, the controller 11 allows the user A and the user C to have conversation. After Step S25, the controller 11 shifts the process to Step S8.

Figure 16:
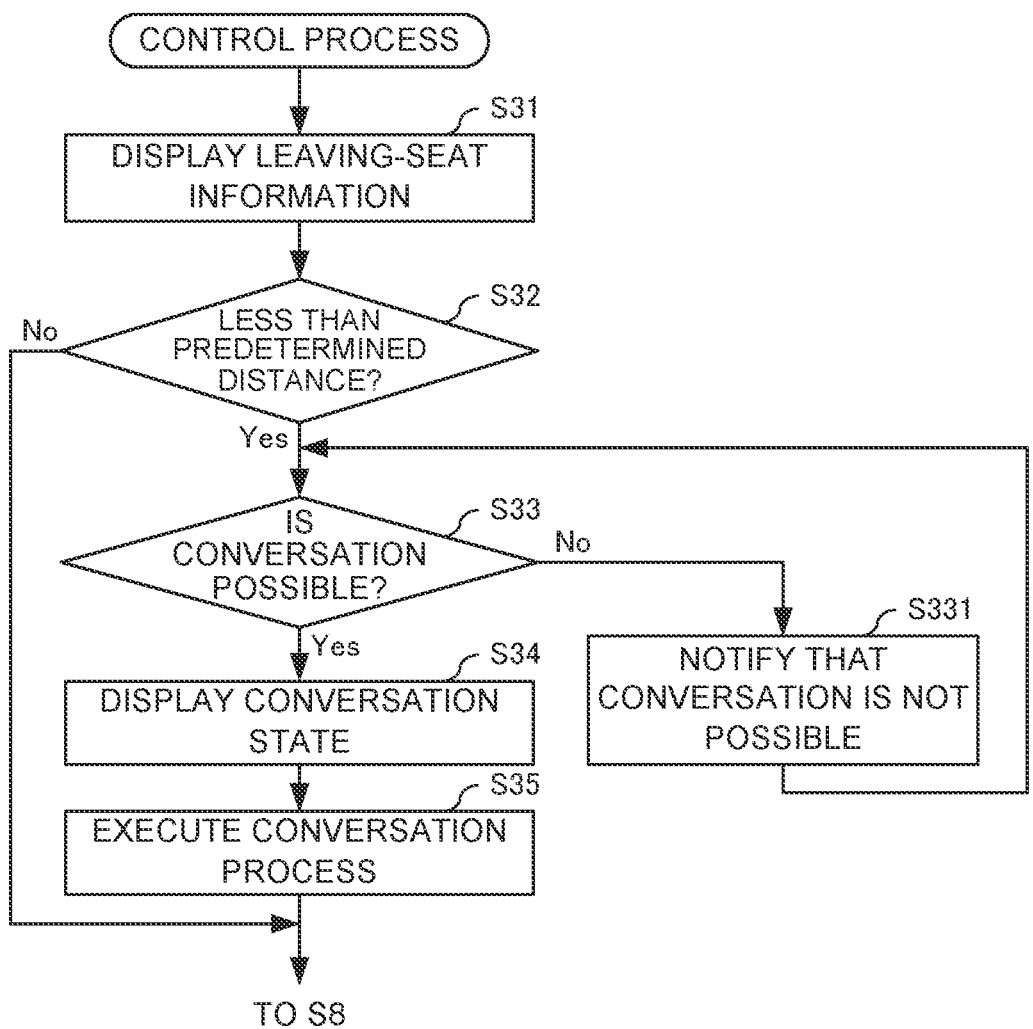
FIG. 16 is a flowchart for illustrating an example of the procedure of the conversation control process executed in the virtual office system according to the embodiment of the present disclosure.

FIG. 16 illustrates another example of the aforementioned control process in Step S7.

In Step S31, the controller 11 displays leaving-seat information in the user icon in the virtual space. For example, as illustrated in FIG. 10, when the user B in the office R1 moves to the seat of the user D after walking from his/her own seat with the user terminal 3b left at his/her own seat in order to have conversation with the user D in the office R1, the controller 11, in the virtual space (virtual office Br1), moves the user icon b1 in accordance with change in the current position of the user B. In addition, the controller 11 displays information indicating that the user B is away from his/her seat in the virtual office Br1.

Herein, it is assumed that the user B and the user D are in conversation in the office R1 (see FIG. 10). In this case, for example, the user E at home moves the user icon e1 of the user E to a position which is less than the predetermined distance from the user icon b1 in the virtual office Br1 in order to have conversation with the user B (Yes in S32).

When the distance between the user icon e1 and the user icon b1 becomes less than the predetermined distance, the controller 11 determines whether or not the user is available for conversation, in Step S33. For example, the controller 11 determines whether or not the user B, with whom the user E wishes to have conversation, is available for conversation. When the controller 11 determines that the user B is available for conversation (Yes in S33), the controller 11 shifts the process to Step S34. On the other hand, when the controller 11 determines that the user B is not available for conversation (No in S33), in Step S331, the controller 11 notifies the user E that conversation with the user B is not possible, and notifies the user B of the information indicating that a conversation request is received from the user E.

For example, when the user B finishes the conversation with the user D and is available for conversation (Yes in S33), the controller 11 displays the user icon b1 of the user B so as to be able to identify that the user B is available for conversation, in Step S34. The controller 11 also notifies the user E that the user B is now available for conversation.

Consequently, for example, when the user E moves the user icon e1, the distance between the user icon e1 and the user icon b1 is less than the predetermined distance, the controller 11 allows the user E and the user B to have conversation in Step S35. After Step S35, the controller 11 shifts the process to Step S8.

Thus, the controller 11 executes the conversation control process, and executes the display process for the user icon in the virtual space.

As described above, the virtual office system 100 according to this embodiment displays a first user icon of the user at the predetermined position in the virtual space on the basis of the current position of the user in the real space. In addition, in a case where the virtual office system 100 receives the moving operation of the first user icon displayed at the predetermined position in the virtual space from the user corresponding to the first user icon, the virtual office system 100 displays a second user icon corresponding to the moving operation of the user in the virtual space.

According to the above configuration, for example, the user can move the second user icon in the virtual space while displaying, in the virtual space, the first user icon at the position corresponding to the current position in the real space. Consequently, for example, as illustrated in FIG. 9, in a case where the user A is at his/her seat in the office R1 in the real space, the user A can have online conversation with another user C by moving the user icon a2 which is separated from the user icon a1, in a state in which the user icon a1 is displayed at the seat of the user A in the virtual space (virtual office Br1) (see FIG. 9). According to the operation screen illustrated in FIG. 9, each user can easily grasp that the user A is in online conversation with the user C while the user A is at his/her seat in the office R1.

Thus, according to the virtual office system 100 of this embodiment, it is possible to improve user's convenience in a system that displays user icons in a virtual space.

As illustrated in FIG. 2, the display control system of the present disclosure may be composed of the management server 1, the conversation server 2, and the user terminal 3, may be composed of the management server 1 alone, or may be composed of the user terminal 3 alone.

DISCLOSURE OF APPENDIX

Hereinafter, summary of disclosure extracted from the above embodiment will be appended. The respective configurations and the processing functions described in the following appendixes can be selected to be added or omitted and combined arbitrarily.

APPENDIX 1

A display control system including:
a first display processing unit that displays a first user icon of a user at a predetermined position in a virtual space on the basis of a current position of the user in a real space;
a reception processing unit that receives, from the user corresponding to the first user icon, moving operation of the first user icon displayed at the predetermined position in the virtual space; and
a second display processing unit that displays a second user icon corresponding to the moving operation by the user in the virtual space, in a case where the reception processing unit receives the moving operation of the first user icon from the user.

APPENDIX 2

The display control system described in appendix 1, in which
the second display processing unit displays the second user icon at a position according to the moving operation in a state in which the first user icon is displayed at the predetermined position.

APPENDIX 3

The display control system described in appendix 2, in which
the second display processing unit moves the second user icon in accordance with the moving operation, in the virtual space.

APPENDIX 4

The display control system described in any of appendixes 1 to 3, in which the second display processing unit displays the first user icon and the second user icon in different display modes.

APPENDIX 5

The display control system described in appendix 4, in which
the second display processing unit displays at least one of the first user icon and the second user icon so as to be able to identify a conversation status of the user and any other user in the virtual space.

APPENDIX 6

The display control system described in any of appendixes 1 to 5, further including
a conversation processing unit that controls conversation of a plurality of users in the virtual space, in which
in a case where the user and any other user are in conversation in the virtual space, and the conversation processing unit receives a conversation request to the user from a third party, the conversation processing unit notifies the third party of information indicating that conversation with the user is not possible, and notifies the user of information indicating that the conversation request is received from the third party.

APPENDIX 7

The display control system described in appendix 6, in which
in a case where a state in which the conversation with the user is not possible is changed to a state in which the conversation with the user is possible, the conversation processing unit displays the second user icon in the virtual space so as to be able to identify that the conversation with the user is possible, and notifies the third party who makes the conversation request of information indicating that the conversation with the user is possible.

APPENDIX 8

The display control system described in any of appendixes 1 to 7, in which
the first display processing unit moves the first user icon in the virtual space in accordance with change in the current position of the user in the real space.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A display control system comprising:
a first display processing circuit that displays a first user icon associated with a user at a predetermined position in a virtual space based on a current position of the user in a real space;
a reception processing circuit that receives, from the user associated with the first user icon, a moving operation of the first user icon displayed at the predetermined position in the virtual space; and
a second display processing circuit that displays a second user icon corresponding to the moving operation by the user in the virtual space in a case that the reception processing circuit receives the moving operation of the first user icon from the user, wherein
the second display processing circuit displays the second user icon at a position according to the moving operation while the first user icon is displayed at the predetermined position.

2. The display control system according to claim 1, wherein
the second display processing circuit moves the second user icon, in accordance with the moving operation, in the virtual space.

3. The display control system according to claim 1, wherein
the second display processing circuit displays the first user icon and the second user icon in different display modes.

4. The display control system according to claim 3, wherein
the second display processing circuit displays at least one of the first user icon and the second user icon so as to be able to identify a conversation status of the user and any other user in the virtual space.

5. The display control system according to claim 4, further comprising:
a conversation processing circuit that controls conversations between a plurality of users in the virtual space, wherein
in a case that the user and the any other user are in a first conversation in the virtual space, and that the conversation processing circuit receives a conversation request to the user from a third party, the conversation processing circuit notifies the third party with information indicating that a second conversation with the user is not possible, and notifies the user with information indicating that the conversation request is received from the third party.

6. The display control system according to claim 5, wherein
in a case that a state of the second conversation with the user not being possible is changed to a state in which the second conversation with the user is possible, the conversation processing circuit displays the second user icon in the virtual space so as to indicate that the second conversation with the user is possible, and notifies the third party who made the conversation request with information indicating that the second conversation with the user has become possible.

7. The display control system according to claim 1, wherein
the first display processing circuit moves the first user icon in the virtual space in accordance with change in the current position of the user in the real space.

8. The display control system according to claim 1, wherein
the first display processing circuit causes display modes of the first user icon, before and after the reception processing circuit receives the moving operation, to differ from each other.

9. A display control method executed by one or more processors, the display control method comprising:
displaying a first user icon associated with a user at a predetermined position in a virtual space based on a current position of the user in a real space;

receiving, from the user associated with the user icon, a moving operation of the user icon in the virtual space; and displaying a second user icon at a position corresponding to the moving operation by the user in the virtual space while the first user icon is displayed at the predetermined position in a case that the moving operation of the user icon is received from the user.

10. A non-transitory computer-readable recording medium recording a display control program for causing one or more processors to execute:

displaying a first user icon associated with a user at a predetermined position in a virtual space based on a current position of the user in a real space;

receiving, from the user associated with the user icon, a moving operation of the user icon in the virtual space; and displaying a second user icon at a position corresponding to the moving operation by the user in the virtual space while the first user icon is displayed at the predetermined position in a case that the moving operation of the user icon is received from the user.

\* \* \* \* \*